United States Patent [19]

Corona et al.

[11] Patent Number: 5,274,394
[45] Date of Patent: Dec. 28, 1993

[54] ELECTRONIC ADJUSTMENT OF SLOW SCAN IMAGE REGISTRATION IN AN IMAGE RECORDING APPARATUS

[75] Inventors: Stephen C. Corona, Rochester; John A. Durbin, Webster; William J. Nowak, Webster; Daniel W. Costanza, Webster, all of N.Y.

[73] Assignee: Xerox Corporation, Stamford, Conn.

[21] Appl. No.: 960,220

[22] Filed: Oct. 13, 1992

Related U.S. Application Data

[63] Continuation of Ser. No. 704,238, May 22, 1991, abandoned.

[51] Int. Cl.$^5$ .............................. B41J 2/45; B41J 2/47
[52] U.S. Cl. .................................. 346/1.1; 346/107 R; 346/107 A; 346/160
[58] Field of Search ..................... 346/107 R, 108, 1.1, 346/107 A, 160

[56] References Cited

U.S. PATENT DOCUMENTS

| 4,435,064 | 3/1984 | Tsukada et al. | 346/107 R X |
| 4,525,729 | 6/1985 | Agulnek et al. | 346/107 R X |
| 4,571,602 | 2/1986 | De Schamphelaere et al. | 346/160 |
| 4,575,739 | 3/1986 | De Schamphelaere et al. | 346/160 |
| 4,589,745 | 5/1986 | Plummer | 354/4 |
| 4,897,639 | 1/1990 | Kanayama | 346/107 R X |
| 4,952,951 | 8/1990 | Kumasaka et al. | 346/160 |

OTHER PUBLICATIONS

*Webster's Ninth New Collegiate Dictionary*, Merrion-Webster, Inc., Springfield, Mass., p. 758, 1990.

*Primary Examiner*—Benjamin R. Fuller
*Assistant Examiner*—David Yockey

[57] ABSTRACT

An image bar recording system, which, in a preferred embodiment, utilizes an LED image bar, with associated circuitry for recognizing which of individual LEDs comprising the print bar are out of registration in the slow scan, process direction of a moving photoreceptor upon which the image is to be recorded. Modification of the drive circuits to the individual LEDs results in energization signals being delayed to the identified, misregistered LEDs resulting in an exposure line which is in correct slow scan registration.

According to another aspect of the invention, the delayed signals are selectively applied to intentionally cause a misregistered exposure line when using the image bar in conjunction with a raster output scan system.

4 Claims, 4 Drawing Sheets

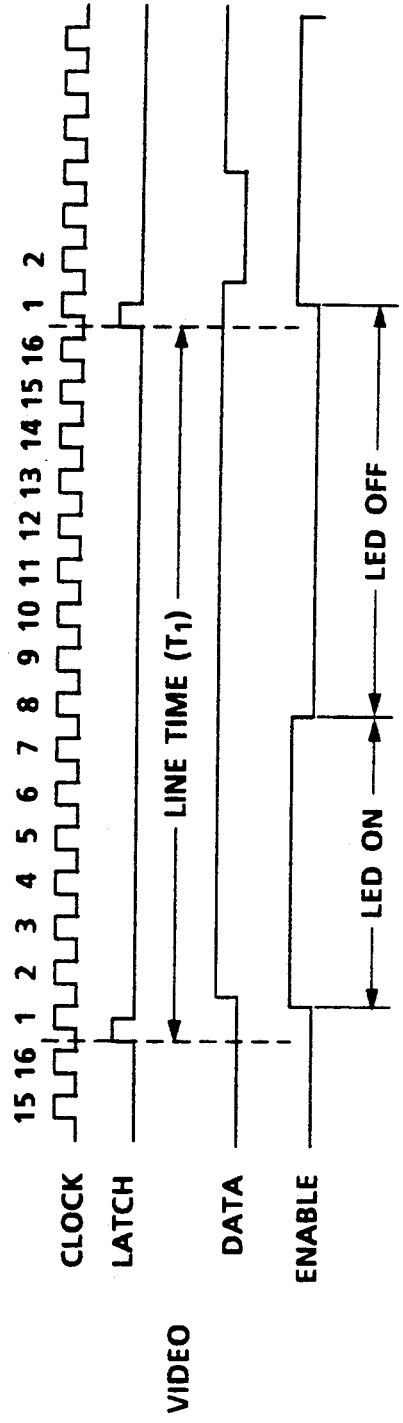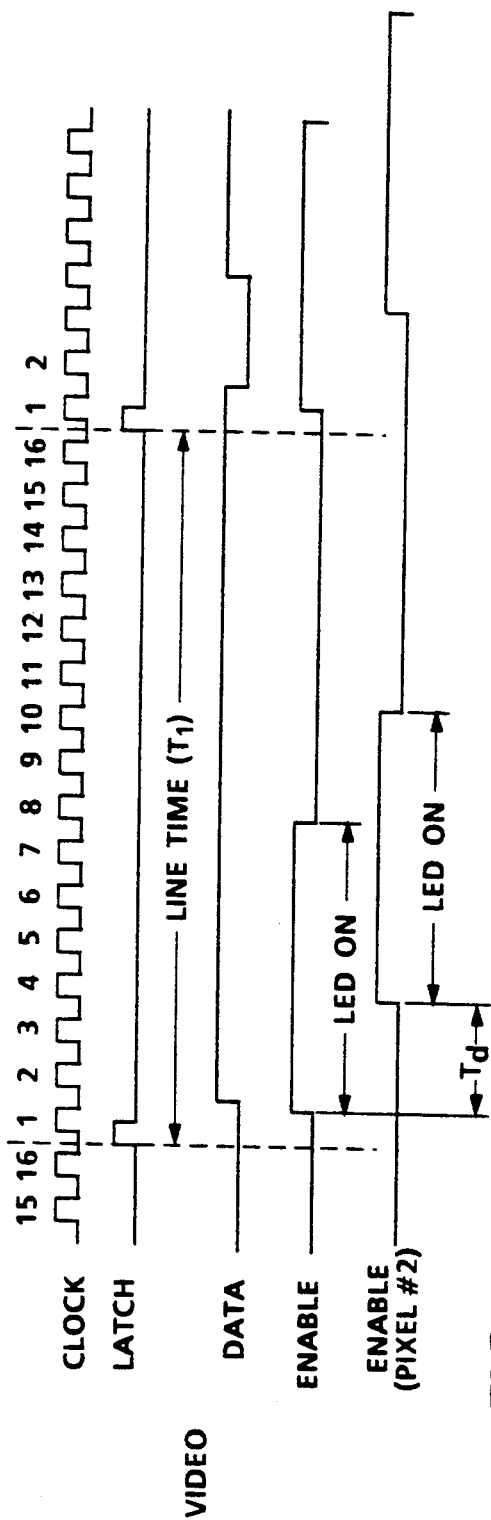

ELECTRONIC ADJUSTMENT OF SLOW SCAN IMAGE REGISTRATION IN AN IMAGE RECORDING APPARATUS

This is a continuation of application Ser. No. 07/704,238, filed May 22, 1991, abandoned.

BACKGROUND AND MATERIAL DISCLOSURE STATEMENT

The present invention relates to a xerographic recording apparatus for line-by-line exposure of the surface of a moving photoreceptor and, more particularly, to a circuit for minimizing registration errors in the sagital (slow scan) direction.

Image print bars used in xerographic recording systems are well known in the art. The print bar generally consists of a linear array of a plurality of discrete light emitting sources. Light emitting diode (LED) arrays are preferred for many recording applications. In order to achieve high resolution, a large number of light emitting diodes, or pixels, are arranged in a linear array and means are included for providing a relative movement between the linear array and the photoreceptor so as to produce a scanning movement of the linear array over the surface of the photoreceptor. Thus, the photoreceptor may be exposed to provide a desired image one line at a time as the LED array is advanced relative to the photoreceptor either continuously or in a stepping motion. Each LED in the linear array is used to expose a corresponding pixel in the photoreceptor to a value determined by image defining video data information.

For a print bar with a resolution of 300 sports per inch (300spi), a pixel size of 50×50 microns on 84.67 micron centers would be a typical configuration. In a xerographic application, where an 8.5 inch wide informational line is to be exposed, a linear array of approximately 2250 pixels, arrayed in a single row, would be required. (If two or more rows of parallel staggered rows of LEDs are used, the spacing between adjacent LEDs can be relaxed but the cost then increases.). One problem with prior art print bars is the difficulty of aligning all of the LED pixels in both the linear direction of the array and in the sagital plane, the sagital plane corresponding to the slow scan or process direction of motion of the photoreceptor. Present chip technology enables very accurate pixel placement in the linear direction, but individual pixels, or, more commonly, groups of pixels formed on the same chip, may be misaligned in the sagital direction, resulting in registration errors in later printed copies of the image being recorded. The significance of this type of registration error is amplified when a plurality of image bars are used, for example, in a full color printing system requiring accurate registration of simultaneous line exposures for each color.

It is known in the prior art to align LEDs in multiple rows in both the linear and sagital direction. U.S. Pat. Nos. 4,571,602 and 4,575,739, both to De Schamphelaere et al., disclose a method for correcting registration errors in an image projected onto the surface of a photoreceptor that results from unevenly positioned point sources along an LED array. In operation, driver control circuits 34 and 35 control the energization of individual LEDs located along first and second LED arrays 24 and 25, respectively. Delay registers in control circuit 34 delay the energization of individual LEDs in the first LED array relative to a photoreceptor speed signal and the energization of LEDs along the second LED array. This energization delay aligns each line of the image in the transverse direction.

U.S. Pat. No. 4,525,729 to Agulnek et al. discloses a method for simultaneously controlling at selected different time intervals the energization of individual LEDs within an LED array.

It is not disclosed in the known prior art how to identify individual pixels, or subarrays of pixels within a larger array, which are misaligned with respect to the other pixels and to correct for the misalignment or misregistration. According to the present invention, a circuit and method is provided for first initially calibrating a print bar to identify pixel to pixel mis-registration and then to provide appropriate circuitry for delaying drive signals which are sent to these misregistered pixels to delay their energization to insure that they are registered with the remainder of those LEDs which are in proper registration. More particularly, the present invention relates to an imaging apparatus for line-by-line exposure of the surface of a moving photoreceptor in a slow scan process direction by at least one linear print bar having a multiplicity of light emitting elements, at least some of said elements misregistered in the slow scan direction, the apparatus comprising: driver circuits for energizing said light emitting elements, circuit means for serially applying input data signal to said driver circuits during a line information time period, and enabling circuit means for applying selectively delayed enabling signals to said drive circuit associated with a light emitting element, or group of light emitting elements, to be energized during the line information time so that the exposed line created by said light emitting elements is in linear registration.

DESCRIPTION OF THE DRAWINGS

FIG. 4 shows a timing chart for a 16 pixel segment of the image bar of FIG. 1.

FIG. 5 shows a timing chart for the segment of FIG. 4 with one pixel out of registration.

DESCRIPTION OF THE INVENTION

Figure 1:
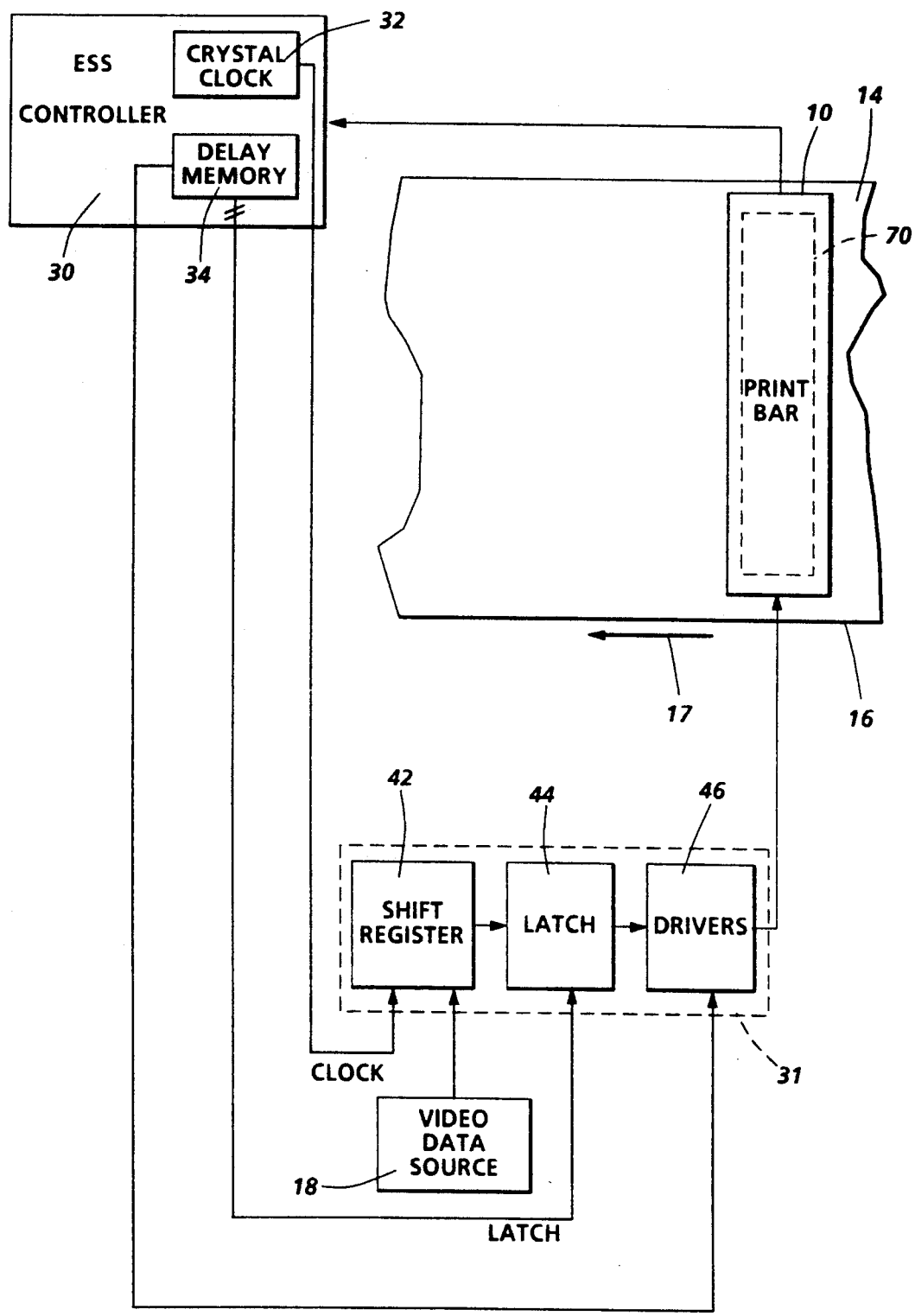
FIG. 1 is a schematic block diagram of an imaging system incorporating the pixel registration correction circuitry of the present invention.

Referring now to FIG. 1, there is shown an image recording system wherein a linear print bar 10, comprising a plurality of LEDS 12 (FIG. 2) aligned in a linear direction in a single row, is positioned above the surface 14 of a photoreceptor web 16 moving in a slow scan process direction indicated by arrow 17. The web surface 14 has been charged to a predetermined potential as is known in the art. The individual LEDs are selectively energized in a manner to be described below to expose the charged surface 14 in conformance with image video data signals generated by a video data source 18. The areas of the web that are exposed are discharged whereas the unexposed areas retain their original charge. The latent image thus formed can then be developed, and the developed image transferred to an output media such as paper and fused. All of these xerographic process steps are well known in the art.

Referring still to FIG. 1, an Electronic Sub System ESS Controller 30 is shown which contains the logic and storage elements for controlling energization of the LEDs comprising print bar 10, via LED driver circuit 31. Incorporated within Controller 30 are a crystal clock 32 and a delay memory storage circuit 34. Driver circuit 31 incorporates a shift register 42, latch register 44 and drive circuit 46. In operation, binary video data signals from data source 18 are read into shift register 42 under control of clocking signals generated by crystal clock 32. Upon receipt of the last binary bit to be entered, the data bits are shifted in parallel into latch register 44 by a latch signal where they are temporarily stored. These signals are shifted out, again in parallel, to driver circuit 46 upon receipt of a latch signal generated by detection of an end of line condition. The driver circuit comprises a plurality of drive transistors, each transistor associated with an individual LED or an LED grouping. The drive circuits, according to the present invention, are selectively addressed by enable signals which are generated from delay memory 34 under control of controller 30. These delay signals are delayed in time with respect to the energization signals being applied to those LEDs which are already in proper registration. The delay time of the signals applied to the misregistered pixels is determined in a way best described with reference to FIGS. 2-4 as follows.

Figure 2:
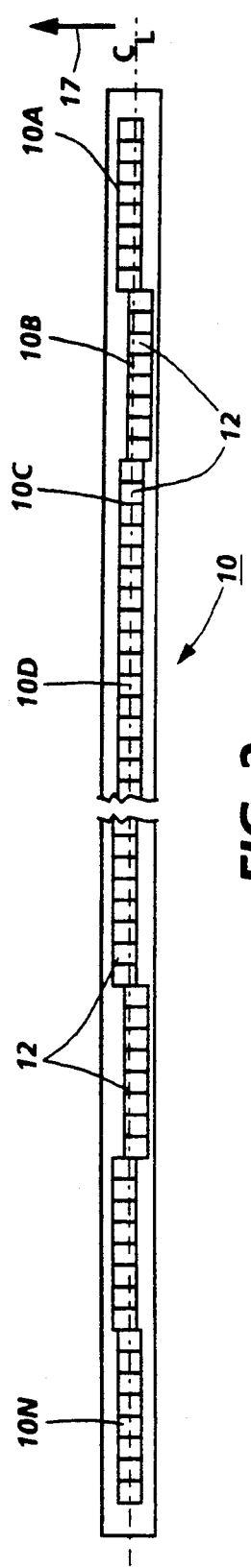
FIG. 2 shows the linear print bar of FIG. 1 with pixel groups misaligned in the sagital dimension.
Figure 3:
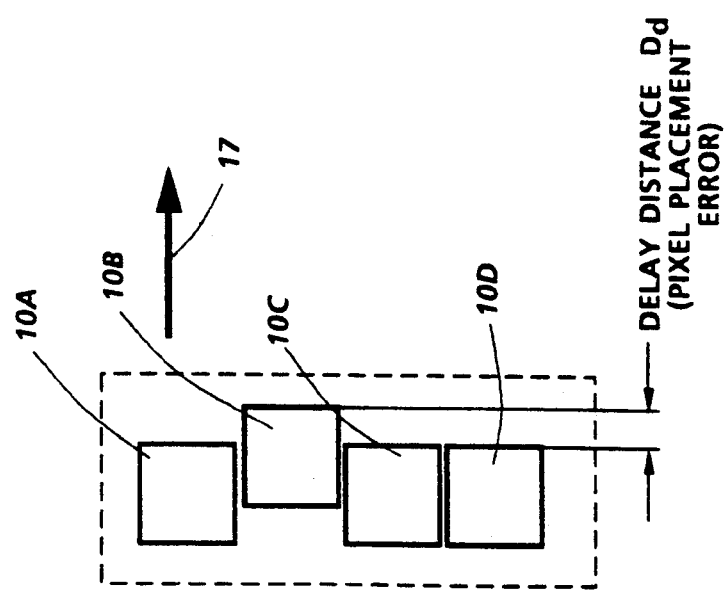
FIG. 3 shows a selected group of pixels with one pixel out of registration.

It is assumed that print bar 10 comprises approximately 2550 LEDs (pixels) aligned in a single row to provide a line exposure of 8.5 inches. It is further assumed that the pixels are registered in the linear direction but one or more pixels are out of alignment (misregistered) in the sagital or slow scan direction. FIG. 2 represents a portion of bar 10, showing pixel groups 10A, 10B, 10C, 10D, 10N, some of which are misregistered in the sagital dimension about a given center line. Each group comprises a plurality of LEDs 12, each LED being in registration with other LEDs in that grouping but not necessarily registered with LEDs in the other groups. LED group 10B, for purposes of illustration, is shown out of registration with the other groups 10A, 10C, 10D. It is assumed these latter 3 groups are in the proper registration. The mis-registration is shown in more detail in FIG. 3. There it is seen that group 10B is out of alignment with the pixel groups 10A, 10C, 10D by a distance $D_d$. This distance is hereafter referred to as a delay distance defined as the distance from the leading edge of the group 10B (the misregistered group) to the leading edge of the other 3 groups (the properly registered groups). Assuming the photoreceptor web 14 moves at a constant velocity $V_{pr}$, the time it takes for a point on the web to move from the leading (right) edge of pixel group 10B to the leading edge of pixel groups 10A, 10C, 10D is a delay time $T_d$ which varies in accordance with the expression $$T_d = D_d / V_{pr} \quad (1)$$

In order to correct for the misregistration condition shown in FIG. 2, the signals from drive circuit 46 which energizes that specific pixel group must be delayed for the time period, $T_d$. The timing delay required can best be understood with reference to FIGS. 4 and 5. FIG. 4 is a timing chart for operating on a 16 pixel LED print bar. The actual duty cycle of the print bar is the ratio of the LED ON time to the total line time $T_l$. When transferred to physical space, the line time $(T_l)$ is generally set to equal the time required for the photoreceptor 16 (at $V_{pr}$) to move the slow scan resolution distance of the system. For a 300×300 spi system operating at a $V_{pr}$ of 10 inches per second, the line time $(T_l)$ would equal 333.3 microseconds. Since at least 16 clocks counts would have to occur to clock in all the data through one serial data input line, a minimum clock frequency of 48 kilohertz would be required for this simple imaginary system. If the pixel placement of the first four pixels represented in group 10B of FIG. 3 and a timing sequence such as shown in FIG. 4 was used, pixel group 10B would be misplaced on the photoreceptor by the delay distance $D_d$. To correct for this, the Enable signal for pixel group 10B is delayed by a value determined by the expression given in (Eq 1). A timing sequence incorporating this concept is shown in FIG. 5. From extrapolation, each pixel or pixel group in print bar 10 can be individually addressed so that, if the pixel, or pixel group, is to be energized (turned on) for the partial line scan, and if that pixel, or group, has previously been identified as being misregistered, the energization signal for that group, or plurality of groups, will be delayed with regard to the pixel groups which are in proper registration.

Each print bar would be subject to unique misregistration conditions. Therefore, according to another aspect of the invention, an individual print bar is pre-calibrated so as to identify those LEDs in the print bar which are misregistered and to generate and store appropriate registration correction (enable signals) for those misregistered LEDs. This calibration is accomplished according to the following procedure. A fixture 70, FIG. 1 incorporating CCD camera arrays is mounted to a precision linear scan mechanism located parallel to the LED bar at the image plane. The fixture is scanned under the LED bar and the location of each pixel in the slow scan direction is measured and saved in controller 32 memory. Subsequent post-processing of the position data is entered into the correction logic of ESS controller 30. This information is transferred by computer diskette, E-Prom or direct data transfer. An alternate method is to create a bar code of the measured position information and fix it directly to the LED Bar from which it was measured. Position correction data could then be scanned into the ESS at the time of LED bar installation.

Figure 6:
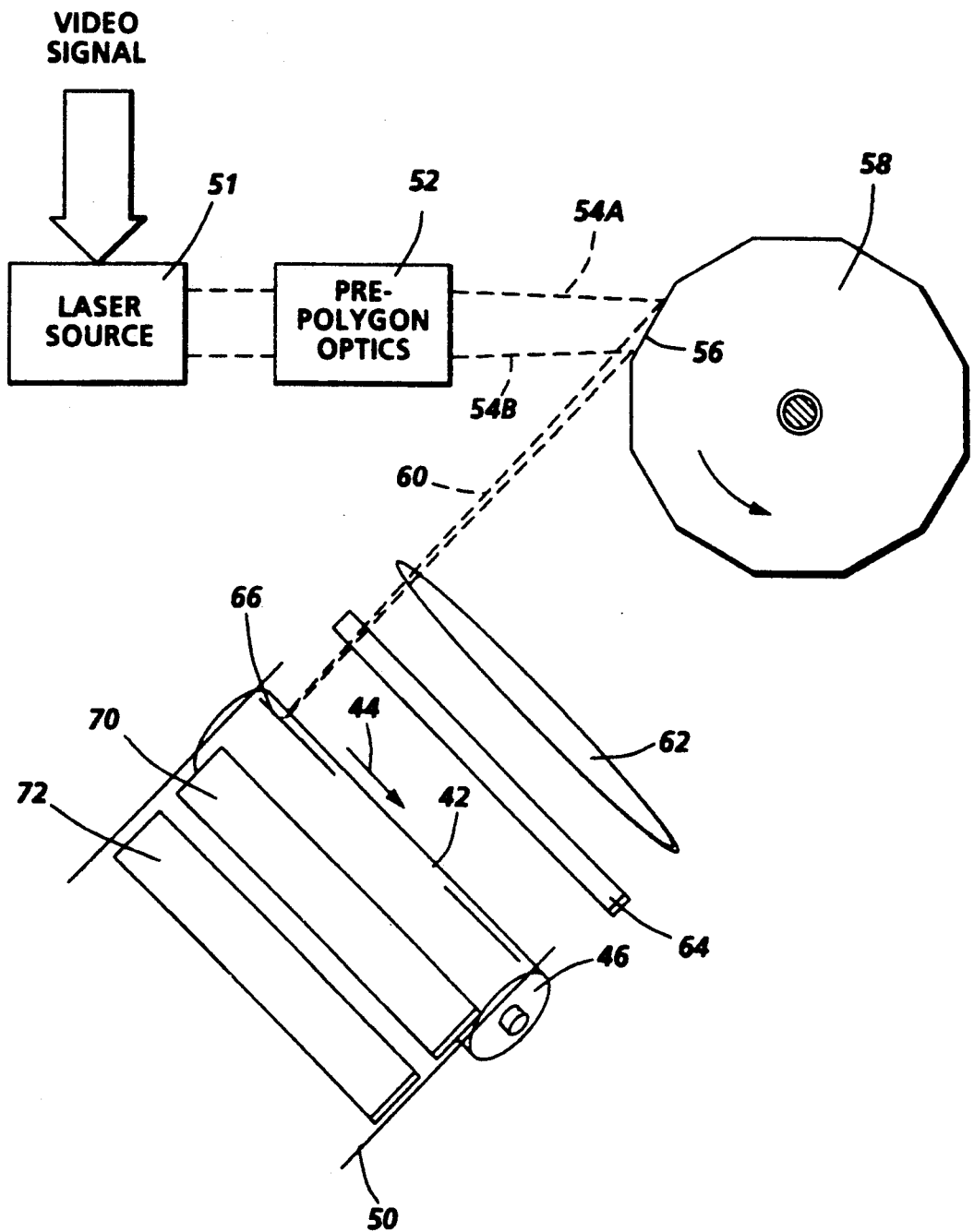
FIG. 6 shows a raster output scanning (ROS) system forming an image in conjunction with a plurality of image bars.

While the above description addresses the specific problem of correcting for pixel to pixel misregistration along a linear print bar, the delayed pixel energization method can be used for other purposes. As one example, consider the hybrid ROS/print bar scan system in FIG. 6. The system is intended to produce color prints from input video data by forming a first latent image on the surface of photoreceptor belt 50 by means of a ROS system, and subsequent latent images in registration with the first ROS latent image, by LED bars 70, 72, the later latent images associated with a specific color to be subsequently developed with the appropriate toner. The system operates as follows: A laser diode 51 serves as the source of high-intensity coherent output beams of light. The laser output is self-modulated and the output beams of light are modulated in conformance with the information contained in a video signal. The modulated beams are expanded and focused by optical elements in a pre-polygon optical subsystem 52, as is known in the art, so that output beams 54A, 54B are formed which are directly incident on a facet 56 of rotating multi-faceted polygon 58. The rotational axis of polygon 58 is orthogonal, or nearly orthogonal, to the plane in which light beams 54A, 54B travels. The facets of polygon 20 are mirrored surfaces which reflect the light impinging thereon. With the rotation of polygon 20 in the direction shown by the arrow, the light beams are reflected from illuminated facet 56 and translated into a scan angle for flying spot scanning. The beam portion 60 reflected from facet 56 passes through an fΘ lens 62 which is designed to focus the beam along the linear focal plane to eliminate the circular arc which is imparted to the beam as it is reflected along the facet surface. The beams are then projected through cylindrical lens 64 which has power only in the sagital direction (orthogonal to the direction of scan).

The focused beam 60 is swept across the surface of belt 50 as a scan line 66 in the direction of arrow 34. Belt 50 is rotated in the process direction shown. Also forming latent images at the surface of belt 50 are print bar 70, 72 which are energized by video data signals applied in the same manner described above in conjunction with the FIG. 1 circuitry. The initial latent image formed by the ROS scanner comprised a plurality of modulated scan lines 66. Each line is conventionally linearized by an fΘ lens to reduce the bow in the scanned line associated with spot reflections from the facet surface of the rotating polygon. However, for some systems, this linearization may yet leave some residual irregularities in the scanned line. This irregular line can be characterized and plotted and the subsequent print bars can be calibrated to print a line which is in registration with the irregular ROS scan line.

Figure 7:
FIG. 7 shows the exposed scan line produced by the ROS system of FIG. 6.

For example, as shown in FIG. 7, ROS scan line 66 is shown as comprising two segments, the pixels associated with segment A being in linear registration while the pixels associated with segment B lie along part of an arc or bow. Print bars 70, 72 would first be calibrated, using one of the previously described calibration procedures, to determine the shape of their distinctive scan line. These characterized lines are then conformed to the line 66 in FIG. 7 to determine the appropriate enabling delay signal which must be applied to each group of pixels.

While the invention has been described with reference to the structures disclosed, it is not confined to the details set forth but is intended to cover such modifications or changes as they come within the scope of the following claims.

We claim:

1. In an imaging apparatus for line-by-line exposure of a surface of a photoreceptor moving in a slow scan process direction by at least one linear print bar having a multiplicity of LED pixels of equal size generally aligned in a single row and a device for correcting for pixel to pixel misregistration, the apparatus comprising:

driver circuits each connected to one of said LED pixels for energizing said LED pixels, circuit means for serially applying input data signals to said driver circuits during a line information on time period, means for detecting ones of said pixels which are misregistered, and circuit means for applying selectively and variably delayed enabling signals to said driver circuits associated with said detected misregistered pixels so as to produce a line exposure at the surface of the photoreceptor which is linearly aligned along said row.

2. The apparatus of claim 1 further including a Raster Output Scanner ROS system in combination with said at least one print bar, said ROS system forming an exposed scan line with a characteristic linear registration pattern at the photoreceptor wherein said circuit means apply said selectively and variably delayed signals to said drive circuit whereby said print bar LED pixels conform to the registration pattern of the scan line formed by said ROS system.

3. The apparatus of claim 1 wherein said delayed enabling signals are applied to said driver circuits by a time delay period, $T_d$, given by an expression $$T_d = D_d/V_{pr}$$

where $V_{pr}$ is a speed in inches/second at which the photoreceptor is moving in the slow scan direction and $D_d$ is a misregistration distance in inches.

4. A method for a line-by-line exposure of a photoreceptor moving in a slow scan process direction, the exposure accomplished by at least one image print bar which includes a plurality of light emitting pixels of equal size generally aligned in a single row, said method including the steps of:

optically determining which of said pixels are misregistered in the slow scan direction, storing information on said misregistered pixels in binary data format in selected memory, applying video binary data signals in parallel format to driver circuits associated with energization of said pixels, enabling the driver circuits associated with the pixels to be energized for a given line exposure, and delaying enabling drive signals to said misregistered pixels by a variable time period selected to compensate for said misregistration resulting in an exposure line in which all areas exposed by said misregistered pixels are in registration in the slow scan direction.

* * * * *